United States Patent
Beard et al.

(10) Patent No.: US 7,410,572 B2
(45) Date of Patent: **\*Aug. 12, 2008**

(54) COMBINATION PARTICULATE AND ACID-NEUTRALIZING FILTER

(75) Inventors: John H. Beard, Kearney, NE (US); Allan Roush, Thorntown, IN (US)

(73) Assignees: Baldwin Filters, Inc., Kearney, NE (US); D-A Lubricant Company, Inc., Indianapolis, IN (US)

(\*) Notice: Subject to any disclaimer, the term of this patent is extended or adjusted under 35 U.S.C. 154(b) by 0 days.

This patent is subject to a terminal disclaimer.

(21) Appl. No.: 11/585,001

(22) Filed: Oct. 23, 2006

(65) Prior Publication Data

US 2007/0034559 A1 Feb. 15, 2007

Related U.S. Application Data (63) Continuation of application No. 11/216,223, filed on Aug. 31, 2005, now Pat. No. 7,132,047, which is a continuation of application No. 09/859,843, filed on May 17, 2001, now Pat. No. 6,969,461, which is a continuation-in-part of application No. 09/487,126, filed on Jan. 19, 2000, now Pat. No. 6,478,958.

(51) Int. Cl.
*B01D 36/02* (2006.01)

(52) U.S. Cl. ............ 210/203; 210/206; 210/316; 210/317; 210/416.5; 210/440; 210/502.1; 210/DIG. 13

(58) Field of Classification Search ........... 210/200, 210/203, 205, 206, 209, 266, 316, 317, 416.5, 210/440, 502.1, DIG. 13; 137/268; 422/261, 422/275–279, 282
See application file for complete search history.

(56) References Cited

U.S. PATENT DOCUMENTS

| | | | |
|---|---|---|---|
| 1,914,999 | A | 6/1933 | Maverick et al. |
| 2,537,992 | A | 1/1951 | Gross et al. |
| 2,843,268 | A | 7/1958 | Kennedy |
| 2,929,506 | A | 3/1960 | Belgarde |
| 3,005,555 | A | 10/1961 | Bosworth |
| 3,529,719 | A | 9/1970 | Graybill |

(Continued)

FOREIGN PATENT DOCUMENTS

EP 0 287 527 A2 10/1988

(Continued)

OTHER PUBLICATIONS

European Patent Office Search Report; Application No. 00204283.6-2113; date of search: Dec. 11, 2001.

*Primary Examiner*—Matthew O Savage
(74) *Attorney, Agent, or Firm*—Leydig, Voit & Mayer, Ltd.

(57) ABSTRACT

The present invention provides a filter apparatus for use in removing impurities and acids contained in a fluid that includes a particulate filter and an acid-neutralizing filter. Preferably, the particulate filter and the acid-neutralizing filter are positioned within a housing. A conduit having a pressure reduction section is arranged to create a pressure differential across the acid-neutralizing filter such that a portion of the fluid to be filtered by the filter apparatus passes through the acid-neutralizing filter.

76 Claims, 4 Drawing Sheets

U.S. PATENT DOCUMENTS

| | | | |
|---|---|---|---|
| 4,075,097 A | 2/1978 | Paul | |
| 4,075,098 A | 2/1978 | Paul et al. | |
| 4,324,660 A | 4/1982 | Peyton et al. | |
| 4,336,042 A | 6/1982 | Frantz et al. | |
| 4,347,224 A | 8/1982 | Beckert et al. | |
| 4,501,660 A | 2/1985 | Hebert | |
| 4,557,829 A | 12/1985 | Fields | |
| 4,655,914 A | 4/1987 | Wada | |
| 4,733,449 A | 3/1988 | Spearman | |
| 4,751,901 A | 6/1988 | Moor | |
| 4,802,979 A | 2/1989 | Medley, III | |
| 4,832,836 A | 5/1989 | Selsdon | |
| 4,872,976 A | 10/1989 | Cudaback | |
| 4,906,389 A | 3/1990 | Brownawell et al. | |
| 4,946,485 A | 8/1990 | Larsson | |
| 5,042,617 A | 8/1991 | Brownawell et al. | |
| 5,049,269 A | 9/1991 | Shah | |
| 5,068,044 A | 11/1991 | Brownawell et al. | |
| 5,069,799 A | 12/1991 | Brownawell et al. | |
| 5,078,877 A | 1/1992 | Cudaback et al. | |
| 5,112,482 A | 5/1992 | Shaub et al. | |
| 5,180,490 A | 1/1993 | Eihusen et al. | |
| 5,225,081 A | 7/1993 | Brownawell et al. | |
| 5,236,595 A | 8/1993 | Wang et al. | |
| 5,342,511 A | 8/1994 | Brown et al. | |
| 5,447,627 A | 9/1995 | Loafman et al. | |
| 5,459,074 A | 10/1995 | Muoni | |
| 5,490,930 A | 2/1996 | Krull | |
| 5,525,226 A | 6/1996 | Brown et al. | |
| 5,527,452 A | 6/1996 | Grigoriev et al. | |
| 5,538,542 A | 7/1996 | Watanabe et al. | |
| 5,538,543 A | 7/1996 | Watanabe et al. | |
| 5,562,746 A | 10/1996 | Raether | |
| 5,622,544 A | 4/1997 | Shamine et al. | |
| 5,695,637 A | 12/1997 | Jiang et al. | |
| 5,702,602 A | 12/1997 | Brown et al. | |
| 5,718,258 A | 2/1998 | Lefebvre et al. | |
| 5,718,743 A | 2/1998 | Donnelly et al. | |
| 5,738,785 A | 4/1998 | Brown et al. | |
| 5,779,772 A | 7/1998 | Unger et al. | |
| 5,792,245 A | 8/1998 | Unger et al. | |
| 5,851,269 A | 12/1998 | Strope | |
| 5,885,447 A | 3/1999 | Theisen et al. | |
| 5,888,383 A | 3/1999 | Cox | |
| 5,904,357 A | 5/1999 | Demirdogen et al. | |
| 5,906,736 A | 5/1999 | Bounnakhom et al. | |
| 5,996,810 A | 12/1999 | Bounnakhom et al. | |
| 6,045,693 A | 4/2000 | Miller et al. | |
| 6,068,762 A | 5/2000 | Stone et al. | |
| 6,478,958 B1 | 11/2002 | Beard et al. | |
| 6,537,453 B2 | 3/2003 | Beard et al. | |
| 6,787,033 B2 | 9/2004 | Beard et al. | |
| 6,919,023 B2 | 7/2005 | Merritt et al. | |
| 6,969,461 B2 | 11/2005 | Beard et al. | |
| 7,132,047 B2 | 11/2006 | Beard et al. | |
| 2002/0185454 A1 | 12/2002 | Beard et al. | |

FOREIGN PATENT DOCUMENTS

| | | |
|---|---|---|
| GB | 507064 | 6/1939 |
| GB | 836993 | 6/1960 |
| WO | WO 86/03687 A1 | 7/1986 |
| WO | WO 96/20368 | 7/1996 |
| WO | WO 01/85300 A2 | 11/2001 |

COMBINATION PARTICULATE AND ACID-NEUTRALIZING FILTER

CROSS-REFERENCE TO RELATED PATENT APPLICATIONS

This patent application is a continuation of U.S. patent application Ser. No. 11/216,223, filed Aug. 31, 2005, now U.S. Pat. No. 7,132,047, which is a continuation of U.S. patent application Ser. No. 09/859,843, filed May 17, 2001, now U.S. Pat. No. 6,969,461, which is a continuation-in-part of U.S patent application Ser. No. 09/487,126, filed Jan. 19, 2000, now U.S. Pat. No. 6,478,958, the entire disclosures of which are incorporated herein by reference in their entirety.

FIELD OF INVENTION

The present invention relates to a method and apparatus for filtering impurities and neutralizing acid found in fluids in fluid circulating systems. More particularly, the invention is directed to a method and apparatus for removing particulates and acids from oil in an oil circulating system such as the oil system associated with a diesel engine.

BACKGROUND OF THE INVENTION

In various kinds of apparatuses utilizing fluids (for example lubrication oil), fine particulate impurities may find their way into the fluid. If such impurities are not removed, the apparatus, such as an engine, may be damaged. To avoid such catastrophic failures, various kinds of filtering systems have been proposed. In the most usual filtering systems, a filter is commonly inserted into the main circulation system. Main circulation system filters generally have a low density.

Heavy-duty diesel engine life, or time to rebuild, has historically been linked directly to piston ring, cylinder liner or crankshaft bearing life. Engine design parameters require that these engine components be hydrodynamically lubricated, i.e., operate with a film of lubricant separating these engine components from associated metal surfaces. Consequently, the principle mechanism associated with piston rings, cylinder liners and crankshaft journal bearings wear is not metal-to-metal contact or frictional wear. The primary diesel engine wear mode influencing engine life is corrosive wear caused by sulfur and nitrogen containing acids formed during the diesel fuel combustion process. One estimate is that more than 70 percent of heavy-duty diesel engine wear is caused by combustion acid metal corrosion.

Control of diesel engine corrosive wear has historically been accomplished through inclusion of basic or alkaline chemicals within the engine oil that is utilized to form the hydrodynamic lubricant film. These alkaline components rapidly neutralize or solubilize combustion acids upon contact with the acid molecules. The effectiveness of the corrosive wear control is entirely dependent upon the probability of the acid being neutralized by alkaline oil components prior to contact of the acid with engine metal surfaces resulting in corrosive wear. The amount of engine corrosive wear can typically be monitored through the use of oil analysis where cylinder liner wear is associated with iron parts per million (ppm) level in the engine oil. Piston ring wear is monitored by chromium levels and crankshaft bearing wear is reflected by lead levels in the oil.

The corrosive wear process begins in the diesel engine combustion chamber where the hydrocarbon diesel fuel containing sulfur compounds is combusted in the presence of oxygen and nitrogen. The hydrocarbon fuel is converted to principally carbon dioxide and water, creating extremely high gas pressures, which push down on the top of the piston to produce engine power. Also produced are $SO_x$ and $NO_x$ compounds, which rapidly react with the water released during fuel combustion yielding primarily sulfuric acid and nitric acid. These acids reach engine metal surfaces by direct contact in the cylinder bore or as blow-by gases as a normal part of engine operation. The hydrodynamic lubricant film present in the piston ring belt zone will also transport acid molecules throughout the engine as the lubricant is constantly circulated.

Combustion acid neutralization is completed using a simple acid-base reaction where metal carbonates carried as alkaline components within the lubricant directly react with sulfuric and nitric acids. The effectiveness of corrosive wear control is totally dependent upon the probability of these metal carbonates coming in contact with the acid molecules before these same molecules contact engine metal surfaces. Another factor influencing the rate and efficiency of acid neutralization is acid solubilization within the lubricant by another oil additive classified as an ashless dispersant. Dispersants are long chain hydrocarbon polymers, which are functionalized by terminating the polymer chain with a functional group generally containing basic nitrogen. Dispersants will rapidly complex with combustion acids dispersing or solubilizing them within the lubricant for transportation to a metal carbonate where the acid is converted to a neutral metallic salt. The combined efficiency of dispersant acid complexing and metallic carbonate acid neutralization controls the rate of engine wear.

Overbased or alkaline metallic detergents have been widely utilized as metallic carbonate carriers in diesel engine oil compositions. Calcium and magnesium sulfonates and phenates account for the majority of the detergents utilized to formulate diesel engine oils. Overbased detergents are produced by incorporating extra calcium or magnesium within a physical structure called a detergent micelle. For example, alkylbenzenesulfonic when reacted with calcium hydroxide and blown with carbon dioxide during the reaction process will produce an overbased calcium sulfonate. The extra metal or calcium present in the detergent micelle structure is calcium carbonate surrounded by oil solubilizing calcium sulfonate detergents. This physical structure circulating within the oil delivers the calcium carbonate to the combustion acid molecules for acid neutralization.

Ideally, there should be no limit to the amount of alkaline detergent incorporated within a diesel engine oil formulation; however, in reality modern diesel engines can only tolerate a limited level of metallic detergents before metallic ash deposits cause piston ring sticking and exhaust valve guttering. These ash deposits are caused by pyrolysis of oil metal organo compounds, principally calcium and magnesium detergents.

Recognizing (1) most diesel engine wear is caused by acid corrosion, (2) the lubricant ash content is limited, and (3) newer diesel engine designs will incorporate exhaust gas recirculation where combustion acids will be concentrated and reintroduced into the engine, a system capable of neutralizing combustion acids without significantly altering diesel engine oil compositions while at the same time filtering solid impurities from the oil circulation system would significantly reduce engine wear including corrosive wear. This is especially true in the later half of an oil drain period when the lubricant's acid-neutralizing capability has been depleted.

SUMMARY OF THE INVENTION

The present invention is directed to a system for extending the normal operating life of a fluid circulation system such as an oil circulation system associated with a diesel engine. The system includes an apparatus for assisting in the removal of acids which accumulate in the fluid, such as an oil, that is pumped through the circulation system. By removing such acids, the useful life of the circulating fluid may be extended thus lowering the operating costs. Preferably, the system of the invention includes a canister through which some or all of the circulating fluid passes. Within the canister is an acid-neutralizing compound which reacts with the acids in the circulating fluid to neutralize the acids. Preferably, once the fluid circulates through the acid-neutralizing compound, the oil passes through a particulate filter prior to returning to the oil circulation system.

The apparatus for removing acids may be inserted into the full flow portion of the fluid circulation system or may be inserted into a bypass system. In either case, from a small portion up to all of the fluid being circulated may pass through the acid-neutralizing apparatus depending upon the desired acid neutralization rate.

The present invention provides a filter apparatus for use in removing impurities contained in a fluid as well as neutralizing acids found in the fluid which includes a housing, a particulate filter, an acid-neutralizing filter, and a conduit. The particulate filter, acid-neutralizing filter and conduit are contained within the housing. The acid-neutralizing filter and the particulate filter are arranged such that a percentage of the fluid to be filtered by the filter apparatus passes through the particulate filter and the remainder of the fluid passes through the acid-neutralizing filter. The conduit includes a pressure reduction section which is arranged to create a pressure differential across the acid-neutralizing filter to draw a portion of the total fluid flow through the acid-neutralizing filter.

The invention provides for a filter apparatus for use in removing acids and impurities contained in a fluid comprising a housing, a particulate filter contained in the housing, an acid-neutralizing filter contained in the housing, and a conduit contained in the housing, the conduit including a pressure reduction section. The conduit may be joined to the housing or it may be integrally formed as a part of the housing. The pressure reduction section is arranged to create a pressure differential across the acid-neutralizing filter such that a portion of the fluid to be filtered by the filter apparatus passes through the acid-neutralizing filter. The pressure reduction section may include either a thin-plate orifice, a long radius nozzle, a Dall nozzle, or a venturi. Preferably, the pressure reduction section comprises a venturi.

In one embodiment, a venturi pressure reduction section is used wherein the venturi has a throat having an internal diameter of between about 0.5 inches and 1.25 inches. More preferably, the venturi has a throat having an internal diameter of about 0.75 inches. Further, in one embodiment, the conduit includes at least one passageway passing though the wall of the pressure reduction section of the conduit. Preferably, the at least one passageway is four passageways each having a diameter of between about 0.1 to about 0.2 inches in diameter and more preferably, the four passageways each have a diameter of about 0.2 inches. Further, in one embodiment, the inside diameter of the upstream end and downstream end of the conduit is preferably between about 0.7 to about 1.5 inches. More preferably, the inside diameter of the upstream end and the downstream end of the conduit is about 1.25 inches.

The acid-neutralizing filter of the invention preferably contains an acid-neutralizing compound. Preferably, the acid-neutralizing compound is selected from the group consisting of crushed limestone, calcium carbonate, and magnesium carbonate.

The present invention also provides for a filter apparatus for use in removing impurities and acids contained in a fluid by filtration comprising a housing, a particulate filter, an acid-neutralizing filter, and a conduit which includes a pressure reduction section in the form of a venturi, the conduit including at least one passageway through a wall of the conduit at the venturi. The filter apparatus is arranged such that the fluid to be filtered by the filter apparatus flows into the housing. Less than 100% of the fluid entering the housing passes through the particulate filter while the remainder of the fluid entering the housing is drawn through the acid-neutralizing filter. The fluid drawn through the acid-neutralizing filter flows into the conduit and mixes with the fluid filtered by the particulate filter. Preferably, from about 90% to about 97% of the fluid entering the apparatus passes through the particulate filter and the remainder, preferably about 3% to about 10%, of the fluid entering the apparatus passes through the acid-neutralizing filter.

Also provided is a filter apparatus for use in removing acids and impurities contained in a fluid by filtration comprising a housing, a particulate filter contained in the housing, the housing and the particulate filter arranged such that from about 90% to about 97% of the fluid to be filtered by the filter apparatus passes through the particulate filter, an acid-neutralizing filter arranged such that about 3% to about 10% of the fluid to be filtered by the filter apparatus passes through the acid-neutralizing filter; and a base plate comprising a threaded central passage and one or more ports.

Also provided is a method of removing impurities contained in a fluid by filtration, the method comprising:
 (a) introducing a fluid to a filtering apparatus comprising a particulate filter and a acid-neutralizing filter;
 (b) filtering a first portion of the fluid with the particulate filter;
 (c) creating a pressure differential across the acid-neutralizing filter whereby a second portion of the fluid is drawn through the acid-neutralizing filter.

In one embodiment, the method is achieved where the pressure differential results from the first portion of the fluid passing through the particulate filter and subsequently passing through a conduit including a pressure reduction section. The fluid passing through the pressure reduction section creates a pressure differential across the acid-neutralizing filter resulting in the second portion of fluid passing through the acid-neutralizing filter. In one embodiment, the pressure reduction section comprises a thin-plate orifice, a long radius nozzle, a Dall nozzle, or a venturi. Preferably, the pressure reduction section comprises a venturi. Also, preferably, the acid-neutralizing filter contains an acid-neutralizing compound and more preferably, the acid-neutralizing compound is selected from the group consisting of crushed limestone, calcium carbonate, and magnesium carbonate.

Preferably, the fluid passing through the acid-neutralizing compound in the acid-neutralizing filter next passes through a second particulate filter before entering the conduit.

The invention also provides a filter apparatus for use in removing impurities and acids contained in a fluid by filtration in a filtration assembly that includes a housing, a particulate filter; a particulate filter support, an acid-neutralizing filter, a second particulate filter, a second particulate filter support and a conduit which includes a pressure reduction section in the form of a venturi, the conduit including at least one passageway through a wall of the conduit at the venturi. In such embodiments, the filter apparatus is arranged such that the fluid to be filtered by the filter apparatus flows into the housing, a portion of the fluid then flows through the particulate filter, through the particulate filter support and into the interior of the support. As this filtered fluid flows through the interior of the support and into the conduit within the acid-neutralizing filter, a predetermined portion of the fluid is drawn through the acid-neutralizing filter. The fluid drawn through the acid-neutralizing filter through the inlet ports flows through the acid neutralizing compound, preferably selected from the group consisting of crushed limestone, calcium carbonate and magnesium carbonate, into the second particulate filter, through the second particulate filter support, and through the passageway through the conduit and joins the fluid filtered by the particulate filter passing though the conduit and out of the acid-neutralizing filter.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of an understanding of the invention reference will now be made to the apparatus as shown in the figures and specific language will be used to describe the same. It will nevertheless be understood that no limitation of the scope of the invention is thereby intended.

The present invention is directed to a system for extending the normal operating life of a fluid circulation system such as an oil circulation system associated with a diesel engine. The system includes an apparatus for assisting in the removal of acids which accumulate in the fluid, such as an oil, that is pumped through the circulation system. By removing such acids, the useful life of the circulating fluid may be extended thus lowering the operating costs. For instance, with acid-neutralization as contemplated by the present invention, mileage on a diesel engine used to propel a typical diesel truck may be extended up to a total of 100,000 miles or more between oil changes. This interval is especially important in such systems where the fluid circulation system may contain as much as 50 gallons of oil.

Preferably, the system of the invention includes a canister through which some or all of the circulating fluid passes. Within the canister is an acid-neutralizing compound which reacts with the acids in the circulating fluid to neutralize the acids. Preferably, once the fluid circulates through the acid-neutralizing compound, the oil passes through a particulate filter prior to returning to the oil circulation system.

Figure 1:
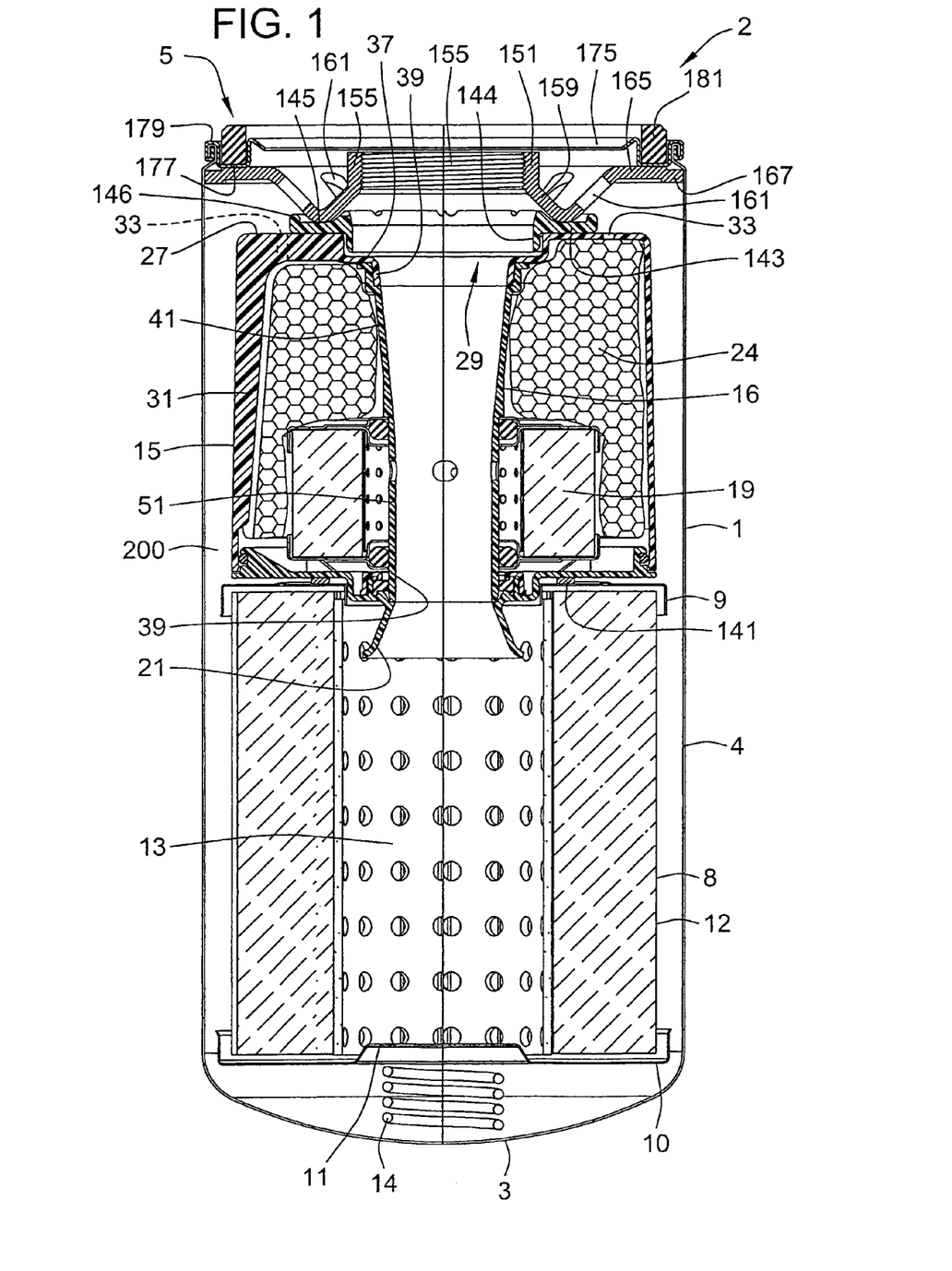
FIG. 1 is a cross sectional view showing a first embodiment of the filtering apparatus of the claimed invention.
Figure 2:
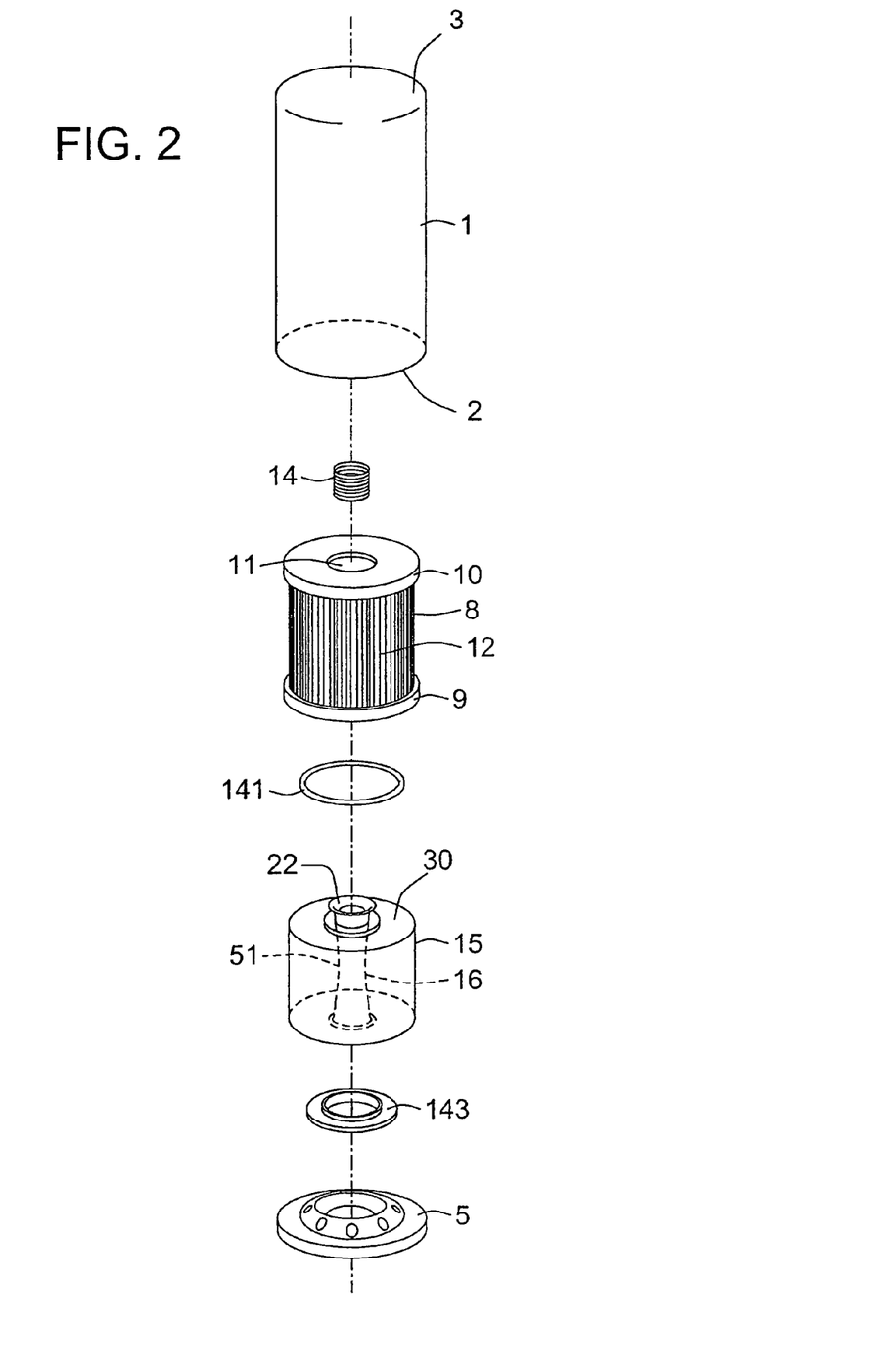
FIG. 2 is an exploded perspective view of components of the present invention.

FIG. 1 is a cross sectional view of a first embodiment of the filtering and acid-neutralizing apparatus of the present invention. The filtering system may be detachably secured to a block of an internal combustion engine for the filtering of lubricant oil. Preferably, the apparatus of the invention is attached through a spin-on connection.

The filtering apparatus comprises a shell 1, preferably in cylindrical form, having an open end 2 and a closed end 3, a sidewall 4 and a base plate/seaming lid assembly 5. The shell 1 can be made of any suitable material depending on the intended use of the apparatus. Examples of suitable materials include steel, aluminum, or plastic. Preferably the shell is drawn from relatively heavy gauge steel to include the closed end 3, the open end 2 and the sidewall 4 which is preferably substantially cylindrical. Housed within the shell 1, is a primary particulate filter 8, and an acid-neutralizing filter 15. The particulate filter 8 and the acid-neutralizing filter 15 are retained in the shell 1 by a base plate\seaming lid assembly 5

The particulate filter 8, acid-neutralizing filter 15, and conduit 16 are preferably all installed in the shell 1 in stacked relationship, with the particulate filter 8 arranged within the shell 1, the acid-neutralizing filter 15 stacked on top of the particulate filter 8 adjacent the base plate/seaming lid assembly. It will be understood that in an alternate arrangement, the primary particulate filter 8 may be contained in a first housing while the acid-neutralizing filter may be located in a second canister. In such a configuration, the first and second canisters are preferably joined by the conduit 16.

The particulate filter 8 is composed of a material and designed so as to permit filtering of particulates from the fluid entering the filter. The particulate filter 8 may be formed from any suitable filter media 12 for this purpose. Examples of suitable filter media for the particulate filter 8 include cellulose, synthetic fiber, or micro-glass Preferably, the particulate filter 8 is formed from micro-glass, synthetic fiber or other synthetic media.

The particulate filter 8 is constructed in a manner which is well known in the art and is preferably of a typical tubular shape. The particulate filter 8 includes filter media 12 wrapped around a perforated inner support 13 in a circular arrangement and in sealing engagement with upper and lower end caps 9 and 10.

The lower end of the particulate filter 8 is sealingly engaged in a u-shaped channel formed within the interior end of the lower end cap 10. The lower end cap 10 is in the form of a u-shaped cap into which the bottom ends of perforated inner support 13 and the particulate filter media 12 fit, and are thus maintained in a spaced concentric relationship within the shell 1. The lower end cap 10 preferably includes a depression 11 on the exterior of the cap into which the end of a coiled spring 14 is seated. The upper end cap 9 is also u-shaped and has a central opening which sealingly engages the top of the perforated inner support 13 as well as the filter media 12. Optionally, the exterior of the particulate filter 8 may also be surrounded by a perforated exterior support tube (not shown). Where an exterior support tube is used, it too is sealingly engaged by the upper and lower end caps 9 and 10. The upper and lower end caps 9 and 10 are sealingly engaged with the filter media and perforated support tube using potting material such as plastisol or by epoxy.

In operation, oil passes through the particulate filter media, through the perforated inner support into the particulate filter annulus, and out of the filter annulus and through the conduit passing through into the acid-neutralizing filter.

Figure 3:
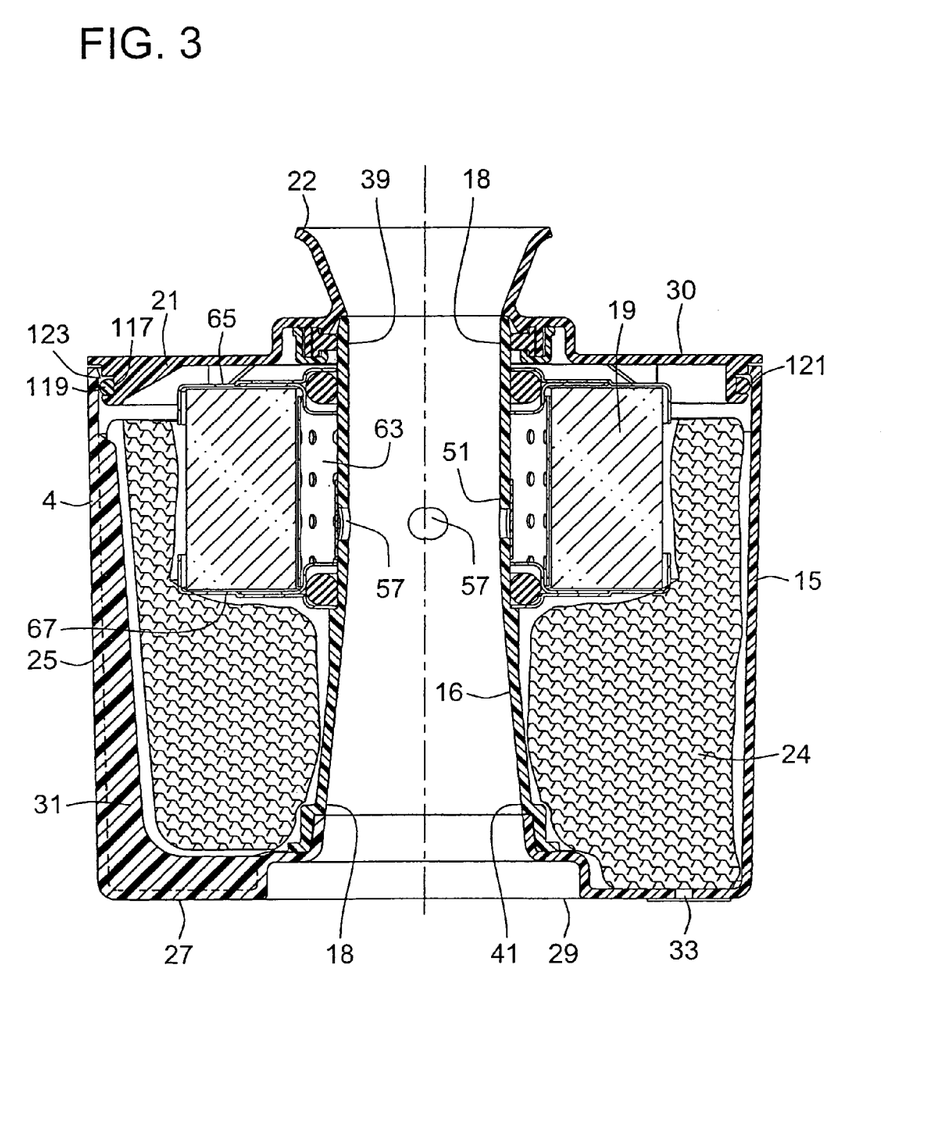
FIG. 3 is a cross sectional view of the acid-neutralizing shell and contents of the present invention.
Figure 4:
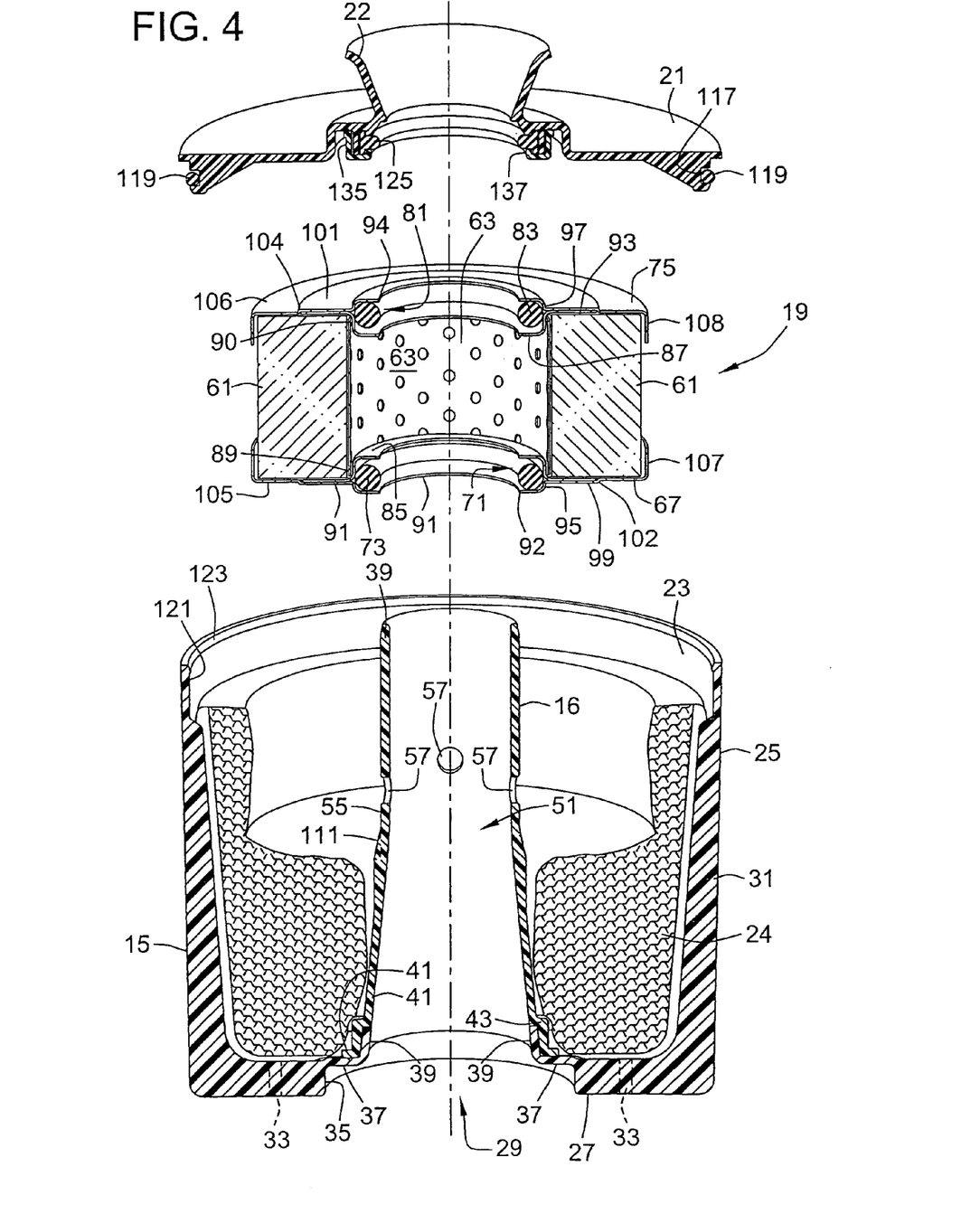
FIG. 4 is an exploded cross sectional view of the acid-neutralizing shell of FIG. 3.

The acid-neutralizing filter contains an acid-neutralizing compound and is positioned such that acids found in fluids such as oil passing through the acid-neutralizing compound are neutralized. In one embodiment the acid-neutralizing filter includes various components including a container 15, a central conduit 16, a second particulate filter 19, an end cap 21 which includes a flared conduit extension 22, and an acid-neutralizing compound 24. The container 15 may be formed from various materials including metals and plastics. Preferably the container 15 is formed from a moldable plastic material such as nylon and includes an open end 23, side walls 25, a partially closed end 27 having a central opening 29, and interior fins 31. The interior fins 31 extend from the interior of the sidewall 4 and preferably continue around the partially closed end of the container 15. Preferably, the interior fins 31 gradually increase in size as they approach the partially closed end of the container 15. Preferably, the container 15 includes from about 8 to about 16 interior fins which preferably have a width of from about 0.10" to about 0.25" to provide sufficient stiffness to the container 15.

Located between the fins, preferably on the partially closed end of the container 15, are inlet ports 33 passing through the container. The fluid to be treated and filtered, preferably oil, passes through these ports and into the filter. The inlet ports 33 preferably have a diameter which assists in preventing the acid-neutralizing compound within the container 15 from flowing out of the container. Preferably, the inlet ports 33 have a diameter of from about 0.06" to about 0.25" and more preferably from about 0.1" to about 0.15". Alternatively, inlet slots may be used. Preferably, slots having a length of from about 0.5" to about 0.75" and a width from about 0.06" to about 0.15" may be used. Preferably, a screening material is also provided to prevent outflow of the acid-neutralizing compound. The screening material is preferably a synthetic porous material made of polyester or nylon or a wire mesh material made of stainless steel, preferably having openings of from about 0.0005" to about 0.001". The screening material may be placed either inside the container 15 across the inlet ports 33 or on the exterior of the container 15 across the inlet ports to prevent the acid-neutralizing compound placed in the container from escaping the container.

The central opening of the partially closed end of the container 15 includes a stepped configuration comprising a central depression 35, a shoulder 37 surrounding the central opening and an inward facing lip 39 extending from the shoulder inward into the container and past the inner ribs. This inward facing lip 39 provides a surface for engaging the conduit 16. The central depression 35 and shoulder 37 provide a surface for a seal to permit sealing engagement with the base plate 5.

Inserted centrally in the interior of the acid-neutralizing filter of the present invention is the conduit 16. The conduit 16 comprises a tube with open upstream 39 and downstream 41 ends that permit fluid to flow through. The conduit 16, can take any suitable form. Preferably, where a venturi is incorporated into the conduit 16, the venturi is of a form that causes the fluid flow through the pressure reduction section 51 to be substantially linear fluid flow. One preferable form of venturi is one similar to the type of venturi used in venturi gauges that are known in the art. Filters incorporating such conduits demonstrate better flow qualities through the conduit as flow is directed in a linear fashion rather than in multiple directions.

The conduit 16 can be composed of any suitable material, such as stainless steel, regular steel or plastic of a suitable strength. Preferably the conduit 16 is composed of nylon plastic. The downstream end 41 of the conduit 16 sealingly engages the partially closed end of the container 15 in a manner to present minimal friction losses caused by fluid flowing through the conduit 16. Preferably, the conduit 16 includes a stepped configuration having an interior shoulder 43 permitting the downstream end of the conduit to encircle and sealing engage the inward facing lip 39 of the partially closed end of the container 15. Preferably, the conduit ends in a second shoulder 45 which engages the interior side of the partially closed end of the container 15 providing a further sealing surface. To assure effective sealing engagement, the conduit 16 is preferably joined to the container 15 via ultrasonic welding or by a spin weld. Alternatively, the conduit may be integrally formed as a part of the container 15 such as by molding or metal forming.

The conduit 16 includes a pressure reduction section 51. The pressure reduction section 51 can be in any suitable form, such as a Dall nozzle, a thin-plate orifice, a long radius nozzle, or a venturi (also sometimes referred to as a "venturi tube"). Preferably, the conduit 16 includes a venturi as depicted in the accompanying figures. A venturi is a device that classically incorporates a simple converging and diverging cross section and uses the basic Bernoulli principle to relate fluid velocity to pressure. Thus, to incorporate these principles, as discussed herein, the conduit 16 includes a pressure reduction section 51 that comprises a reduced diameter portion of the conduit near the longitudinal center of the conduit. The pressure reduction section 51 can be of any width (diameter) suitable to effectuate the desired amount of bypass filtration in the context of the present invention. Any suitable internal diameter for the pressure reduction section (i.e., measured at the interior of about the narrowest point therein) may be used. Preferably, the internal diameter of the pressure reduction section 51 is between about 0.5 and about 1.25 inches. More preferably, the narrowest point of the pressure reduction section (also referred to as a throat 55) has an internal diameter of between about 0.7 and about 1.0 inches. Most preferably the throat has an internal diameter of about 0.75 inches.

The change of internal diameter between the pressure reduction section 51, and the diameter of the upstream end 41 and downstream end 39 of the conduit also impacts the pressure-reducing capacity of, and flow through, the conduit 16. The internal diameter of the upstream end 41 and downstream end 39 of the conduit can be any suitable diameter in the context of the present invention. Preferably, the internal diameter of the upstream end 33 and downstream end 39 of the conduit are between about 0.7 to about 1.5 inches. More preferably, the internal diameter of the upstream and downstream ends of the conduit are between about 1.0 to about 1.25 inches. Optimally, the internal diameter of the upstream and downstream ends of the conduit is about 1.25 inches.

In real flow settings, friction and turbulence play roles in the flow speed of a liquid passing through a venturi. These factors influence a venturi's ability to create a pressure differential. To counteract the effect of such forces, the conduit transitions into and out of the pressure reduction section 51. Preferably, the diameter of the conduit 16 gradually enlarges in the transition area from the throat to the downstream end 39. The rate of enlargement of the conduit from the throat to downstream end 39 can be at any suitable rate sufficient to reduce turbulence. Preferably, the angle of enlargement on the downstream side of the throat is marked by an angle of between about 5° to about 8°. More preferably, the angle of enlargement is about 8°.

Turbulence and friction are also counteracted in part by gradually narrowing the diameter of the conduit 16 from the upstream end 41 to the pressure reduction section 51. This narrowing can be at any suitable rate. Preferably, the conduit is narrowed at an angle of about 20° to about 22° between the upstream end 41 and the pressure reduction section 51. More preferably, the narrowing is marked by an angle of about 22°.

The pressure reduction section 51 also includes one or more bypass ports 57, preferably positioned at or near the throat 55 that permit fluid to flow into the conduit. The bypass port 57 comprises an orifice transiting through the conduit. Preferably, the pressure reduction section 51 has two to four bypass ports 57 positioned evenly around the conduit 16 to promote even flow through the entire acid-neutralizing filter 15. In accordance with the present invention, and as further described herein, the bypass port 57 can be of any suitable size to permit a pre-determined portion of fluid to flow into the conduit 16, thereby causing a predetermined amount of fluid to flow across (i.e., be treated and filtered by) the acid-neutralizing filter 15 to achieve a predetermined total filtration and acid removal efficiency. Preferably four bypass ports with diameters of about 0.1 to about 0.2 inches, more preferably about 0.200 inches, are included in the conduit.

Preferably, the conduit 16 has an exterior shoulder 111 encircling the conduit at an appropriate location between the bypass ports and the downstream end 41 of the conduit. This shoulder permits effective placement of the second particulate filter 19.

The second particulate filter 19 is designed to prevent particles of the acid-neutralizing compound from entering the fluid circulation system. The second particulate filter 19 includes filter media 61 wrapped around a perforated inner support 63 in a circular arrangement and in sealing engagement with first and second end caps 67 and 75. Optionally, the exterior of the bypass particulate filter media 61 may also be surrounded by a perforated exterior support tube (not shown) or by a pre-filter to prevent the acid-neutralizing compound from packing between the pleats of the media 61. Where a pre-filter is used, it is preferably a synthetic porous material made of polyester or nylon or a wire mesh material made of stainless steel. Preferably, the pre-filter has openings of from about 0.0005" to about 0.001". Where an exterior support tube or pre-filter is used, it too is sealingly engaged by the first and second filter end caps 67 and 75.

The bypass particulate media 61 is composed of a material and designed so as to permit filtering of particulates from the fluid entering the filter. The media 61 may be formed from any suitable filter media. Examples of suitable filter media for the media 61 include cellulose, synthetic fiber, or micro-glass Preferably, the particulate media 61 is formed from micro-glass, synthetic fiber or other synthetic media.

The first end of the bypass particulate filter 19 (the end of the bypass particulate filter nearest the particulate filter 8) is sealingly engaged in a u-shaped channel formed within the interior end of the bypass particulate filter first end cap 67. The first end cap 67 is in the form of a u-shaped cap into which the ends of perforated inner support 63 and the bypass particulate filter media 61 fit. The first end cap 67 includes a central opening through which the conduit 16 may pass. The first end cap 67 also includes an inward facing u-shaped channel 71 which holds an o-ring 73 which can engage and seal the bypass particulate filter against the outer circumference of the conduit 16.

The second end cap 75 is also unshaped and has a central opening which sealingly engages the top of the perforated inner support 63 as well as the bypass filter media 61. In a manner similar to the first end cap 67, the second end cap 75 also includes an inward facing u-shaped channel 81 which holds an o-ring 83 which can engage and seal the bypass particulate filter against the outer circumference of the conduit 16.

The end caps including the inward facing u-shaped channels are preferably formed from two components, preferably each formed from a metal such as steel. Alternatively, other materials where suitable, such as plastics, may be used. The first component includes a first horizontal inward facing shoulder 85, 87 which is integrally formed with and extends from the inner vertical u-channel wall 89, 90. The outer side of the inner u-channel wall 89, 90 preferably forms much of the bottom of the inward facing u-shaped channels 71 and 81. The inner u-channel wall then transitions to an outward oriented horizontal extension 91 and 93 which preferably engages at least a portion of the end of the filter media 61. A second component is preferably provided to form the second exterior vertical wall and a portion of the bottom of the inward facing u-shaped channels. The second component includes an inward facing horizontal shoulder 92 and 94 forming the second wall of the inward facing u-shaped channels, a vertical wall 95 and 97 forming a portion of the bottom of the inward facing u-shaped channels, a further horizontal outward extending wall 99 and 101, a step 102, 104 a second horizontal wall 105, 106, and the vertical outer wall 107 and 108 of the u-shaped channel engaging the filter media 61.

The outward oriented horizontal extension 91 and 93 is used to join the first component to the second component second horizontal wall 105, 106 by glue, heat welding or spot welding. The steps 102, 104 permits the first and second components to be joined such that a uniform interior surface is presented to the filter media to facilitate the seal formed between the assembled end cap and the filter media. The assembled end caps 67 and 75 are then sealingly engaged with the filter media and perforated support tube using potting material such as plastisol or by epoxy.

During assembly, the conduit 16 is inserted into the container 16 and the conduit stepped configuration sealingly engages the container opening inward facing lip 39. The two components may be joined together in a snug fitting relationship to obtain a seal or preferably is joined by ultrasonic welding or via spin welding. Alternatively, they may be potted together using plastisol or epoxy or otherwise sealed together. The bypass particulate filter 19 is then passed over the outer circumference of the conduit 16 and slid down the conduit until the filter 19 engages the outer conduit shoulder 111.

A suitable acid-neutralizing compound 24 is then used to fill the remaining cavity within the container 16. Preferably, the compound is calcium carbonate which is preferably in the form of crushed limestone as this is a low cost, highly effective acid neutralizer.

Crushed limestone suitable for use in the acid-neutralizing filter of the present invention is available from Iowa Limestone under the trade names Unical S and Unical F, by Franklin Industrial Mining under the designations C6×16 and C8×12, and by Great Lakes Mining under the designations 20×200 and 12×40. Table A, set forth below, illustrates the standard sieve properties of these products. In addition, other suitable acid-neutralizing products which may be used in the acid-neutralizing inner shell 34 include amorphous magnesium carbonate and amorphous calcium carbonate. Generally, the smaller the acid-neutralizing compound particles, the greater the surface area of the compound that is exposed to the fluid to be treated. The use of smaller particles thus increases the effectiveness of the treatment. The use of smaller particles also increases the pressure drop through the acid-neutralizing compound container. Therefore, the size of the particles selected should be balanced against the amount of pressure drop that can be tolerated across the container. Also, the degree of packing in combination with the particle size will impact both the amount of oil which may be moved through the acid-neutralizing canister as well as the pressure drop thus impacting on the materials used to construct the canister and its various components.

TABLE A

LIMESTONE SPECIFICATIONS

| Company | Grade | U.S. Screen Number | % Passing Screen |
|---|---|---|---|
| Iowa Limestone | Unical S | 25 | 100 |
| | | 45 | 98.5 |
| | | 70 | 68 |
| | | 100 | 44.5 |
| | | 200 | 12.5 |
| | Unical F | 8 | 90 |
| | | 16 | 9.5 |
| | | 25 | 2.5 |
| | | 45 | 1.5 |
| Franklin Industrial Min | C6 × 16 | 4 | 100 |
| | | 5 | 99.54 |
| | | 6 | 97.28 |
| | | 7 | 71.33 |
| | | 8 | 35.57 |
| | | 10 | 11.65 |
| | | 12 | 5.45 |
| | | 16 | 2.7 |
| | C8 × 12 | 8 | 90 |
| | | 16 | 9.5 |
| | | 25 | 2.5 |
| | | 45 | 1.5 |
| Great Lakes | 20 × 200 | 6 | 100 |
| | | 12 | 100 |
| | | 20 | 100 |
| | | 40 | 65 |
| | | 60 | 31 |
| | | 100 | 14 |
| | | 200 | 7 |
| | 12 × 40 | 6 | 100 |
| | | 8 | 100 |
| | | 20 | 39 |
| | | 40 | 6 |
| | | 60 | 1 |
| | | 100 | 1 |

A typical analysis of a commonly available crushed limestone product is set forth in Table B:

TABLE B

Great Lakes
Limestone Chemical Composition

| Compound | % of Sample |
|---|---|
| Calcium Carbonate | 98.2 |
| Magnesium Carbonate | 1.36 |
| Silica | 0.23 |
| Aluminum | 0.08 |
| Iron | 0.13 |
| Sulfur | 0.06 |
| Total Available Carbonate | 99.54 |

Once the container cavity is filled with the acid-neutralizing compound, the upper end cap 21 is used to seal the container 15. The upper end cap 21 includes an outer wall having an outward facing channel 117 which holds an o-ring 119. This o-ring 119 engages and seals the upper end cap 21 against the inner side 121 of the open end of the container 15. The inner side of the open end of the container 15 may include a sloped surface 123 to facilitate insertion of the upper end cap 21. The sloped surface 123 leads in to a slight undercut in the housing wall (about 0.01 inches undercut). The lid o-ring snaps into the undercut, holding the lid in place.

The upper end cap 21 also includes an inward facing d-ring type seal 125 for sealingly engaging the upstream end 33 of the conduit 16. The upper end cap 21 also includes an outward facing flared conduit extension 22. Once the upper end cap 21 is engaged on the container 15, the flared conduit extension 22 extends and completes the conduit in the preferred venturi shape. The upper end cap 21 is preferably formed from two molded parts which are then joined together. The first, predominate part, includes the outer o-ring u-shaped channel 117, an end wall 127, a first shoulder 129, a second shoulder 131, the flared extension 22, and a u-shaped channel 133 for holding the d-ring type seal 125. The second part closes the d-ring channel to maintain the d-ring type seal 125 in position. This second part is also in the shape of a u-shaped channel with back wall 135 of the channel somewhat longer than front wall 137 which engages the d-ring type seal 125. The back wall 135 is attached to the first predominate part preferably by ultrasonic welding. Alternatively, the first predominate part and the second part may be joined by spin welding.

Once the acid-neutralizing filter is assembled, the filtering apparatus is ready to be completed. The components are stacked in the appropriate order and the shell 1 is placed over the stacked parts. The shell is then seamed to the base plate\seaming assembly.

In stacking the components, a base plate adapter seal 143 is first required. The base plate adapter seal 143 is provided to effect a seal between the neutralizing filter 15 and the base plate/seaming lid assembly. The base plate adapter seal 143 is preferably formed from nitrile or another suitable rubber compound. The seal 143 includes a first lip 144, a body portion 145, and a second lip 146. The body portion engages the flat portion of the partially closed end 27 of the container 15 and a portion of the base plate 151 while the first lip engages the inner wall of the container central opening 29.

The base plate adapter seal 143 is laid down in the appropriate direction. Next, the assembled acid-neutralizing filter 15 is set with its end 29 engaging the seal 143. Next, a flat circular gasket 141 is placed over the flared conduit extension 22. The flat circular gasket effects a seal between the downstream end of the particulate filter 8 and the upstream end of the acid-neutralizing filter 15 and is sized to permit the flared conduit extension 22 to pass through the center of the gasket. The particulate filter 8 is then seated on the acid-neutralizing filter. Finally, the spring 14 is seated in the depression 11 on the exterior of the lower end cap 10. The spring 14 is preferably a coil spring formed from steel and having a spring force of about 35 to about 50 psi. The shell 1 is then passed over the stacked assembly.

A base plate\seaming lid assembly 5 is then required to complete the assembly. The base plate 151 is used in conjunction with the base plate adapter seal 143 which is placed between the central opening 29 of the partially closed end 27 of the container 15 and the base plate 151. The base plate 151 includes a conventional threaded passage 155 which engages the threads on the apparatus post (not shown). The base plate 151 also comprises a slanting first wall segment 159 which includes inlet ports 161, through which the fluid to be filtered passes, and an upturned internally threaded segment 155 which is suitable for engaging an oil inlet post (not shown). Preferably, the inlet ports 161 are arranged angularly in a circular array around the perimeter of the threaded passage 155 and are located within the slanted first wall segment 159 of the base plate.

Inlet fluid enters through the inlet annulus 161 and base plate adapter seal 143 prevents this inlet fluid from bypassing the filters and returning directly to the engine without filtration. The base plate 151 also includes a transition section 165 that extends outward from the slanted first wall segment 159 above the inlet ports 161 at a smaller incline than the first slanted wall segment. The base plate 151 further comprises an outer rim 167, which is attached to the outermost portion of the transition section 165 and is positioned adjacent the outer open end of the shell 1.

A seaming lid 175 is then attached to the base plate 151 and to the open end of the shell 1, as seen in FIG. 1. The seaming lid 175 preferably comprises a circular ring having an interior circular groove 177 that consists of a unshaped channel with its open end facing towards the open end of the shell 1, and a downward turn outer rim 179 that surrounds the exterior of the seaming lid and protrudes beyond the periphery of both the base plate 151 and the shell 1. Preferably, the seaming lid 175 is applied by placing the bottom side of the portion of the seaming lid that forms the circular groove 177 within the outer lip 178 of the base plate, and welding the bottom side of the seaming lid at the circular groove 180 to the transition section 165 of the base plate. Preferably, this welding of the base plate 151 and seaming lid 175 occurs before sealing the filter.

A circular seal 181 is placed within the circular groove 180. The circular seal 181 engages the apparatus, such as an engine, to effect a seal to prevent leakage of the outlet fluid passing from the apparatus to the filter. The circular seal 181 may take the form of any of such well-known seals (e.g., a gasket) and preferably is smooth on the exterior surface. Preferably, the circular seal 181 is in the form of a flat seal that includes an undercut portion that fits within the circular groove 180 which assists in holding the circular seal 181 in place.

The seaming lid 175, preferably welded to the base plate 151 as described above, is applied to the filter of the present invention, compressing the spring 2. As seen in FIG. 1, the outer rim of the seaming lid, which is elevated above the circular groove 180, and which extends beyond the periphery of the base plate 151 and the shell 1, forms a channel into which the periphery of the open end of the shell 1 can fit. Preferably, the shell 1 further comprises a slightly overturned outer lip (not shown) that extends beyond the periphery of the shell 1. When the elements of the filter apparatus are assembled as described above, the outer rim 190 of the seaming lid and the outer lip of the housing are subsequently turned over (crimped) thereby sealing the contents of the filter within the shell 1.

During attachment of the base plate\seaming lid assembly, the spring 14 is compressed between the interior of the closed end of the shell 1 and the depression 11 on the exterior of the lower end plate 10.

After the filter assembly is prepared, an inlet annulus 200 is created between the shell 1 and the exterior of the particulate filter 8 and the exterior of the acid-neutralizing filter container 15. In operation of the filter of the present invention, fluid flows into the filter after passing from the apparatus outlet and through the base plate passages. The fluid then passes into the inlet annulus 200. Most of the inlet fluid then flows through the particulate filter 8, exiting through the particulate filter's downstream side 10 and flow support tube.

After passing through the particulate filter 8 and support tube, the fluid is in the particulate filter annulus. Fluid within the particulate filter annulus may then pass through the flared conduit extension 22 and into the acid-neutralizing filter conduit 16.

To promote flow across the acid-neutralizing filter 15, without requiring a pump, a pressure differential is created across the acid-neutralizing filter that promotes such flow. The conduit 16 in the present embodiment of the invention accomplishes this in part by taking the form (at least in part) a venturi or other suitable pressure reduction configuration. Thus, the conduit 16 has a pressure reduction section 51 (preferably comprising a venturi throat 55) whereby flow speed of the fluid through the conduit 16 is increased, and thus pressure is lowered within the conduit 16. This lower pressure results in a pressure differential across the acid-neutralizing filter 15 communicated via the bypass port 57 which is positioned in the pressure reduction section 51, preferably at the throat 55, the narrowest portion of the conduit 16.

This lowering of pressure within the conduit 16 is in accordance with Bernoulli's principle. In view of Bernoulli's principle, if the velocity of fluid flow is v, a pressure p, a density of the fluid w, and the acceleration of gravity g; then the effect of using the conduit 16 having a pressure reduction section 51 can be expressed by the formula:

$$p/w + v^2/2 = \text{constant}.$$

Thus, by decreasing the cross-sectional area of the conduit 16, the velocity v of the fluid flow within the conduit 16 is increased in the area with the reduced cross sectional area, and thus pressure within the conduit is decreased. This effect promotes flow through the acid-neutralizing filter ports 33, through the acid-neutralizing compound, through the bypass particulate filter, and through the conduit bypass port and into the conduit.

The present invention provides apparatuses and methods wherein the amount of fluid that is to be drawn across the acid-neutralizing filter 15 can varied by varying the size of the bypass port 57 and/or by increasing the number of bypass ports. Similarly, the amount of narrowing of the diameter of the pressure reduction section 51 and/or the diameter of the conduit on either side of the pressure reduction section will effect the draw of fluid across the acid-neutralizing filter 15. Thus, by changing the size of the diameter of the conduit at the pressure reduction section 51, and the diameter of the conduit on either side of the pressure reduction section, alone or in combination with changing the size of the bypass port(s) 57, the present invention provides methods and apparatuses whereby varying amounts of fluid can be filtered through both the primary particulate filter and the acid-neutralizing filter.

Both the fluid flowing only through the particulate filter 8, and the fluid passing through both the acid-neutralizing filter 15 and the bypass filter 19, then mix in the conduit 16. This mixed fluid will then flow to the downstream end 18 of the conduit and ultimately out of the filter and back to the fluid circulation system such as an oil system for a diesel engine. The amount of fluid treated by the acid-neutralizing filter can be varied as desired for the system to be treated. Preferably, from about 1% to about 15% of the total fluid flow passes through the acid-neutralizing filter. More preferably, about 3% to about 10% of the total fluid flow passes through the acid-neutralizing filter. However, where desired and where the fluid circulation system permits, up to 100 percent of the circulating fluid may pass through the shell 1.

In the manner explained above, the acid-neutralizing filter 15 effectively neutralizes acids in the filtered fluid. However, the present invention is not limited to the features explained above; rather, many modifications and alternations can be conceived by those skilled in the art within the scope of the invention. For instance, the particulate and acid-neutralizing filters may be formed in various manners and of various materials as mentioned above. In addition, while they are preferably located with a single shell, they may be contained within separate but interconnected shells.

All of the references cited herein, including patents, patent applications, and publications, are hereby incorporated in their entirety by reference. The use of the terms "a" and "an"

and "the" and similar referents (e.g., "a base plate" or "the bypass conduit") in the context of describing the present invention (especially in the context of the following claims) should be construed to cover both the singular and the plural, unless otherwise indicated herein or clearly contradicted by context.

While this invention has been described with an emphasis upon the preferred embodiments, it will be obvious to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A filter apparatus for use in removing acids in a fluid comprising:
   a housing having an inlet and an outlet;
   an acid-neutralizing filter contained in the housing, the acid-neutralizing filter comprising a media container having an open end and an imperforate outer sidewall surrounding an acid-neutralizing compound; and
   a particulate filter arranged downstream of the acid-neutralizing compound fluidically between the acid-neutralizing compound and the outlet.

2. The filter apparatus of claim 1 wherein the housing comprises a canister and an end plate, the canister having an open end and a generally cylindrical sidewall therebetween, the end plate being secured to the open end, the end plate providing the inlet and the outlet.

3. The filter apparatus of claim 1, further comprising a conduit having at least one passageway for receiving fluid from the acid-neutralizing filter.

4. The filter apparatus of claim 3, wherein the particulate filter is disposed over the at least one passageway and around the conduit.

5. The filter apparatus of claim 4, wherein a seal is disposed between the particulate filter and the conduit to restrict fluid that has not passed through the particulate filter from entering the at least one passageway.

6. The filter apparatus of claim 3, wherein the conduit has a surface for contacting the fluid, the surface having a conduit surface axial length, and the particulate filter having a particulate filter axial length that is shorter than the conduit surface axial length.

7. The filter apparatus of claim 3, wherein the conduit includes a pressure reduction section arranged to create a pressure differential across the acid-neutralizing filter.

8. The filter apparatus of claim 7, wherein the pressure reduction section includes at least one of a thin-plate orifice, a long radius nozzle, a Dall nozzle, and a venturi.

9. The filter apparatus of claim 1, wherein the media container comprises a media container end cap for disposal over the open end.

10. The filter apparatus of claim 1, wherein the media container comprises a partially closed end generally opposing the open end, the partially closed end comprising an inlet port.

11. The filter apparatus of claim 1, wherein the media container comprises at least one interior fin.

12. The filter apparatus of claim 1, wherein the acid-neutralizing compound includes at least one compound selected from the group consisting of calcium carbonate and magnesium carbonate.

13. A filter apparatus for use in removing acids and impurities contained in a fluid comprising:
   a housing having an inlet and an outlet, the housing comprising a canister and an end plate, the canister having an open end and a generally cylindrical sidewall therebetween, the end plate being secured to the open end, the end plate providing the inlet and the outlet;
   a first particulate filter contained in the housing;
   an acid-neutralizing filter contained in the housing, the acid-neutralizing filter comprising a media container having an imperforate outer side wall surrounding an acid-neutralizing compound, said acid-neutralizing filter being arranged in fluidic parallel with the first particulate filter, and a second particulate filter arranged downstream of the acid-neutralizing compound fluidically between the acid-neutralizing compound and the outlet to prevent particles of acid-neutralizing compound from reaching the outlet; and
   a conduit contained in the housing, the conduit including a pressure reduction section;
   wherein the pressure reduction section is arranged to create a pressure differential across the acid-neutralizing filter such that a portion of the fluid to be filtered by the filter apparatus passes through the acid-neutralizing filter.

14. The filter apparatus of claim 13, wherein the pressure reduction section includes at least one of a thin-plate orifice, a long radius nozzle, a Dall nozzle, and a venturi.

15. The filter apparatus of claim 13, wherein the pressure reduction section comprises a venturi.

16. The filter apparatus of claim 15, wherein the venturi has a throat having an internal diameter of between about 0.5 inches and 1.25 inches.

17. The filter apparatus of claim 15, wherein the venturi has a throat having an internal diameter of about 0.75 inches.

18. The filter apparatus of claim 13, wherein at least one passageway passes through the wall of the pressure reduction section of the conduit.

19. The filter apparatus of claim 18, wherein the at least one passageway is four passageways each having a diameter of between about 0.1 to about 0.2 inches in diameter.

20. The filter apparatus of claim 19, wherein the inside diameter of an upstream end and a downstream end of the conduit is between about 0.7 to about 1.5 inches.

21. The filter apparatus of claim 19, wherein the inside diameter of an upstream end and a downstream end of the conduit is about 1.25 inches.

22. The filter apparatus of claim 18, wherein the at least one passageway is four passageways each having a diameter of about 0.2 inches.

23. The filter apparatus of claim 13, wherein the acid-neutralizing compound includes at least one compound selected from the group consisting of calcium carbonate and magnesium carbonate.

24. The filter apparatus of claim 13 wherein about 90% to about 97% of the fluid entering the fluid apparatus passes through the first particulate filter.

25. A filter apparatus for use in removing impurities and acids contained in a fluid by filtration comprising:
   a housing having an inlet and an outlet; a particulate filter, the housing comprising a canister and an end plate, the canister having an open end and a generally cylindrical sidewall therebetween, the end plate being secured to the open end, the end plate providing the inlet and the outlet;
   an acid-neutralizing filter in fluidic parallel with the first particulate filter, the acid-neutralizing filter comprising a media container having an imperforate outer side wall surrounding an acid-neutralizing compound and a second particulate filter, the second particulate filter arranged downstream of the acid-neutralizing compound fluidically between the compound and the outlet to prevent particles of acid-neutralizing compound from reaching the outlet; and a conduit which includes a pressure reduction section in the form of a venturi, the conduit including at least one passageway through a wall of the conduit at the venturi;

whereby the filter apparatus is arranged such that:

(a) the fluid to be filtered by the filter apparatus flows into the housing;

(b) less than 100% of the fluid entering the housing passes through the particulate filter;

(c) wherein the fluid entering the apparatus and not passing through the particulate filter is drawn through the acid-neutralizing filter; and (d) wherein the fluid drawn through the acid-neutralizing filter flows into the conduit and mixes with the fluid filtered by the particulate filter.

26. The filter apparatus of claim 25, wherein the venturi has a throat having an internal diameter of between about 0.5 inches and 1.25 inches.

27. The filter apparatus of claim 25, wherein the venturi has a throat having an internal diameter of about 0.75 inches.

28. The filter apparatus of claim 25, wherein the at least one passageway is four passageways each having a diameter of between about 0.1 to about 0.2 inches in diameter.

29. The filter apparatus of claim 28, wherein the inside diameter of an upstream end and a downstream end of the conduit is between about 0.7 to about 1.5 inches.

30. The filter apparatus of claim 28, wherein the inside diameter of an upstream end and a downstream end of the conduit is about 1.25 inches.

31. The filter apparatus of claim 25, wherein the at least one passageway is four passageways each having a diameter of about 0.2 inches.

32. The filter apparatus of claim 25, wherein the acid-neutralizing compound includes at least one compound selected from the group consisting of calcium carbonate and magnesium carbonate.

33. The filter apparatus of claim 25 wherein about 90% to about 97% of the fluid entering the fluid apparatus passes through the first particulate filter.

34. A filter apparatus for use in removing acids and impurities contained in a fluid by filtration comprising:

a housing having an inlet and an outlet, the housing comprising a canister and an end plate, the canister having an open end and a generally cylindrical sidewall therebetween, the end plate being secured to the open end, the end plate providing the inlet and the outlet;

a first particulate filter contained in the housing, the housing and the particulate filter arranged such that from about 90% to about 97% of the fluid to be filtered by the filter apparatus passes through the first particulate filter;

an acid-neutralizing filter arranged in fluidic parallel with the first particulate filter such that about 3% to about 10% of the fluid to be filtered by the filter apparatus passes through the acid-neutralizing filter, the acid-neutralizing filter comprising a media container having an imperforate outer side wall surrounding an acid-neutralizing compound, and a second particulate filter arranged downstream of the acid-neutralizing compound fluidically between the compound and the outlet to prevent particles of acid-neutralizing compound from reaching the outlet; and a base plate comprising a threaded central passage and one or more ports.

35. The filter apparatus of claim 34, further comprising a conduit having a pressure reduction section and wherein the pressure reduction section comprises a venturi.

36. The filter apparatus of claim 34, wherein the acid-neutralizing compound includes at least one compound selected from the group consisting of calcium carbonate and magnesium carbonate.

37. A filter apparatus for use in removing acids and impurities contained in a fluid comprising:

a housing having an inlet and an outlet, the housing comprising a canister and an end plate, the canister having an open end and a generally cylindrical sidewall therebetween, the end plate being secured to the open end, the end plate providing the inlet and the outlet;

a first particulate filter contained in the housing;

an acid-neutralizing filter contained in the housing and arranged in fluidic parallel with the first particulate filter, the acid-neutralizing filter comprising a media container having an outer sidewall surrounding an acid-neutralizing compound and a second particulate filter, the second particulate filter arranged downstream of the acid-neutralizing compound fluidically between the acid-neutralizing compound and the outlet to prevent particles of acid-neutralizing compound from reaching the outlet; and a conduit contained in the housing for connecting the first particulate filter to the outlet, the conduit including a pressure reduction section arranged to create a pressure differential across the acid-neutralizing filter such that a portion of the fluid to be filtered by the filter apparatus passes through the acid-neutralizing filter, the pressure reduction section having at least one passageway formed therein in fluidic connection with the second particulate filter, the second particulate filter being disposed around the pressure reduction section of the conduit over said at least one passageway.

38. The filter apparatus of claim 37, wherein the pressure reduction section includes at least one of a thin-plate orifice, a long radius nozzle, a Dall nozzle, and a venturi.

39. The filter apparatus of claim 37, wherein the pressure reduction section comprises a venturi.

40. The filter apparatus of claim 39, wherein the venturi has a throat having an internal diameter of between about 0.5 inches and 1.25 inches.

41. The filter apparatus of claim 39, wherein the venturi has a throat having an internal diameter of about 0.75 inches.

42. The filter apparatus of claim 37, wherein the at least one passageway is four passageways each having a diameter of between about 0.1 to about 0.2 inches in diameter.

43. The filter apparatus of claim 42, wherein the inside diameter of an upstream end and a downstream end of the conduit is between about 0.7 to about 1.5 inches.

44. The filter apparatus of claim 42, wherein the inside diameter of the upstream end and a downstream end of the conduit is about 1.25 inches.

45. The filter apparatus of claim 37, wherein the at least one passageway is four passageways each having a diameter of about 0.2 inches.

46. The filter apparatus of claim 37, wherein the acid-neutralizing compound includes at least one compound selected from the group consisting of calcium carbonate and magnesium carbonate.

47. The filter apparatus of claim 37 wherein about 90% to about 97% of the fluid entering the fluid apparatus passes through the first particulate filter.

48. A filter apparatus for use in removing acids and impurities contained in a fluid comprising:

a housing having an inlet and an outlet, the housing comprising a canister and an end plate, the canister having an open end and a generally cylindrical sidewall therebetween, the end plate being secured to the open end, the end plate providing the inlet and the outlet;

an acid-neutralizing bed contained in the housing comprising a media container having an outer side wall surrounding acid-neutralizing media particles;

a first flow path for fluid running through the housing from the inlet to the outlet, the first flow path running through the acid-neutralizing bed and then through a first particulate filter downstream of the acid-neutralizing bed such that acid-neutralizing media particles are prevented from reaching the outlet when fluid flows from along the first flow path from the inlet to the outlet;

a second flow path for fluid running through the housing from the inlet to the outlet, the second flow path running through a second particulate filter and bypassing the acid-neutralizing bed; and a conduit disposed in the second flow path for fluidically connecting the second particulate filter to the outlet and having a pressure reduction section for deriving a suctioning force from fluid flowing along the second flow path and for suctioning fluid along the first flow path, the first particulate filter being mounted around the pressure reduction section over at least one passageway formed in the pressure reduction section.

49. The filter apparatus of claim 48, wherein the pressure reduction section includes at least one of a thin-plate orifice, a long radius nozzle, a Dall nozzle, and a venturi.

50. The filter apparatus of claim 48, wherein the pressure reduction section comprises a venturi.

51. The filter apparatus of claim 50, wherein the venturi has a throat having an internal diameter of between about 0.5 inches and 1.25 inches.

52. The filter apparatus of claim 50, wherein the venturi has a throat having an internal diameter of about 0.75 inches.

53. The filter apparatus of claim 48, wherein at least one passageway passes through the wall of the pressure reduction section of the conduit.

54. The filter apparatus of claim 53, wherein the at least one passageway is four passageways each having a diameter of between about 0.1 to about 0.2 inches in diameter.

55. The filter apparatus of claim 54, wherein the inside diameter of an upstream end and a downstream end of the conduit is between about 0.7 to about 1.5 inches.

56. The filter apparatus of claim 54, wherein the inside diameter of an upstream end and a downstream end of the conduit is about 1.25 inches.

57. The filter apparatus of claim 53, wherein the at least one passageway is four passageways each having a diameter of about 0.2 inches.

58. The filter apparatus of claim 48, wherein the acid-neutralizing particles include at least one compound selected from the group consisting of calcium carbonate and magnesium carbonate.

59. The filter apparatus of claim 48, further comprising at least one seal between the media container and the second particulate filter to prevent the acid-neutralizing media particles from reaching the fluid exit.

60. The filter apparatus of claim 48, wherein the first and second particulate filters each comprise a tubular filter media surrounding a perforated support.

61. The filter apparatus of claim 48, wherein when fluid is flowing through the housing from the inlet to the outlet, about 90% to about 97% of the fluid passes through the second flow path and wherein about 3% to about 10% of the fluid passes through the first flow path.

62. A filter apparatus for use in removing acids and impurities contained in a fluid comprising:

a housing having an inlet and an outlet, the housing comprising a canister and an end plate, the canister having an open end and a generally cylindrical sidewall therebetween, the end plate being secured to the open end, the end plate providing the inlet and the outlet;

a first particulate filter contained in the housing;

a conduit contained in the housing and disposed to fluidically connect the first particulate filter to the outlet, the conduit including a pressure reduction section; and an acid-neutralizing filter contained in the housing and arranged in fluidic parallel with the first particulate filter, the acid-neutralizing filter comprising a media container having an outer sidewall surrounding an acid-neutralizing compound and a second particulate filter arranged downstream of the acid-neutralizing compound to prevent particles of acid-neutralizing compound from reaching the outlet, the second particulate filter being disposed around the pressure reduction section over at least one passage way formed in the pressure reduction section such that the pressure reduction section creates a pressure differential across the acid-neutralizing filter.

63. The filter apparatus of claim 62, wherein the pressure reduction section includes at least one of a thin-plate orifice, a long radius nozzle, a Dall nozzle, and a venturi.

64. The filter apparatus of claim 62, wherein the pressure reduction section comprises a venturi.

65. The filter apparatus of claim 64, wherein the venturi has a throat having an internal diameter of between about 0.5 inches and 1.25 inches.

66. The filter apparatus of claim 64, wherein the venturi has a throat having an internal diameter of about 0.75 inches.

67. The filter apparatus of claim 62, wherein the at least one passageway is four passageways each having a diameter of between about 0.1 to about 0.2 inches in diameter.

68. The filter apparatus of claim 67, wherein the inside diameter of an upstream end and a downstream end of the conduit is between about 0.7 to about 1.5 inches.

69. The filter apparatus of claim 67, wherein the inside diameter of an upstream end and a downstream end of the conduit is about 1.25 inches.

70. The filter apparatus of claim 62, wherein the at least one passageway is four passageways each having a diameter of about 0.2 inches.

71. The filter apparatus of claim 62, wherein the acid-neutralizing compound includes at least one compound selected from the group consisting of calcium carbonate and magnesium carbonate.

72. The filter apparatus of claim 62, wherein about 90% to about 97% of the fluid entering the fluid apparatus passes through the first particulate filter.

73. The filter apparatus of claim 62, wherein the second particulate filter has a cylindrical filter element disposed concentrically around the pressure reduction section of the conduit.

74. The filter apparatus of claim 73, wherein the first particulate filter is disposed at a closed end of the housing, and the conduit fluidically connects an inner bore of the first particulate filter to the outlet.

75. A filter apparatus for use in removing acids in a fluid comprising:

a housing having an inlet and an outlet;

an acid-neutralizing filter contained in the housing, the acid-neutralizing filter comprising a media container having an outer sidewall surrounding an acid-neutralizing compound;

a conduit having a surface for contacting the fluid, the surface having an axial length, and the conduit being contained in the housing;

a particulate filter arranged downstream of the acid-neutralizing compound fluidically between the acid-neutralizing compound and the outlet, the particulate filter disposed around the conduit and having a particulate filter axial length that is shorter than the conduit surface axial length; and the conduit including a pressure reduction section arranged to create a pressure differential across the acid-neutralizing filter and the conduit including at least one passageway in the pressure reduction section.

76. The filter apparatus of claim 75, wherein the pressure reduction section comprises a venturi.

* * * * *

UNITED STATES PATENT AND TRADEMARK OFFICE
CERTIFICATE OF CORRECTION

PATENT NO. : 7,410,572 B2
APPLICATION NO. : 11/585001
DATED : August 12, 2008
INVENTOR(S) : Beard et al.

It is certified that error appears in the above-identified patent and that said Letters Patent is hereby corrected as shown below:

Column 6, Line 14: "assembly 5" should read --assembly 5.--.

Column 6, Line 30: "mircro-glass" should read --micro-glass.--.

Signed and Sealed this

Eighteenth Day of November, 2008

JON W. DUDAS
*Director of the United States Patent and Trademark Office*